Aug. 24, 1926.

E. J. LE CLAIRE 1,596,883

METHOD FOR TREATING POP CORN

Filed March 4, 1926

Inventor

Eugene J. LeClaire

By

Attorney

Patented Aug. 24, 1926.

1,596,883

UNITED STATES PATENT OFFICE.

EUGENE J. LE CLAIRE, OF ST. PAUL, MINNESOTA, ASSIGNOR OF ONE-HALF TO CHARLES J. MULLAN, OF ST. PAUL, MINNESOTA.

METHOD FOR TREATING POP CORN.

Application filed March 4, 1926. Serial No. 92,174.

My invention relates to method and device for treating pop corn designed to treat the ordinary kernels of pop corn so as to prepare the same for popping. Heretofore a great deal of variation in the percentage of kernels that will pop when heated in the ordinary well known manner has been experienced by those handling pop corn and, even though the pop corn was of the same variety and kind, there seemed to have been a variation in the percentage of corn that would pop when heated. The dealers handling pop corn which they supply to pop corn machines have complaints of these kinds from the experience that I have had.

My method of treating pop corn is designed to overcome these difficulties and is of a simple nature consisting of a device into which the pop corn can be stored and held until it is desired for use in the pop corn machine.

The method consists in placing the pop corn in a receptacle wherein the air is humidified by moisture contained in the receptacle. In starting my method of treating the pop corn, it is desirable to use hot water and to increase the evaporation of the water in the receptacle I have found it practical to use a sponge or other suitable moisture absorbing substance, only placing sufficient liquid in the receptacle to partially cover the sponge.

In carrying out my method I use a pop corn kernel receptacle which is designed to provide a dispenser and which can be readily lifted out of the main humidifying receptacle in its entirety.

A feature of the invention resides in a receptacle and device for humidifying kernels of pop corn, the receptacle being removable from the humidifying container. The kernel receptacle is provided with a constricted or funnel shaped end having a valve therein. When the valve is opened the pop corn kernels are adapted to slide out of the open end of the funnel member into a cup or other suitable receptacle so that a certain predetermined number of kernels can be taken out of the pop corn receptacle each time. As the pop corn kernels run out of the funnel the kernels from above are permitted to settle down evenly without permitting the uppermost kernels to run out of the funnel until the lowermost kernels have passed out of the same. This particular construction is designed to carry out my method of treating pop corn.

A feature of this construction is to permit a certain amount of pop corn to be taken out of the bottom and to then replace the same amount into the top of the receptacle, thereby permitting the lower kernels in the device to be brought in close proximity to the humidifying means within the receptacle and permitting the top kernels to work down to the humidifying means gradually as the kernels are removed from the bottom.

It is a feature of my device to provide a valve which may be pulled open and permitted to snap back shutting off the flow of pop corn out of the container.

It is also a feature to provide a receptacle having an open mesh-like body with a funnel-dispensing end and a funnel shaped perforated valve adapted to close the dispensing funnel.

These features and the objects of my method will be more fully and clearly set forth in the specification and claims.

In the drawings forming part of this specification:

Figure 1:
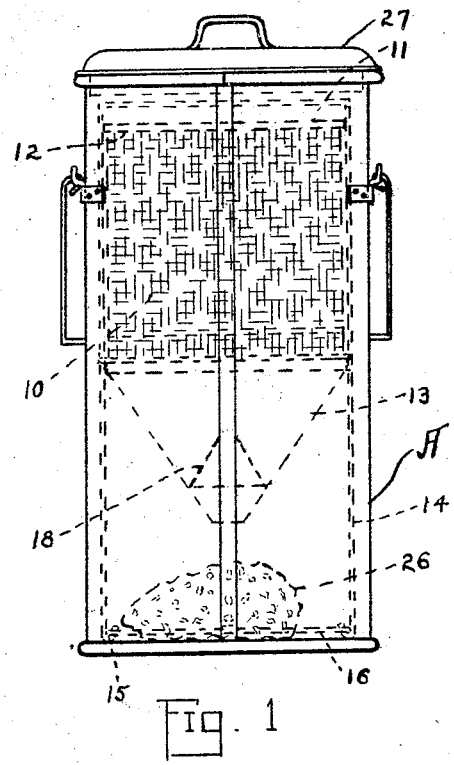
Figure 1 is a side view of a device which is adapted to illustrate means for carrying out my method of treating pop corn.
Figure 2:
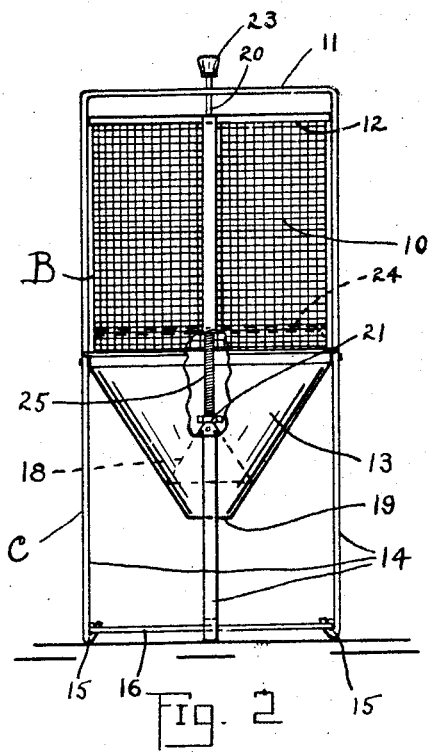
Figure 2 is a side view of the pop corn receptacle, a portion of which is broken away.

In the drawings I have illustrated a device comprising a container A, which is adapted to be used in carrying out my method for treating pop corn.

The method consists in placing the pop corn in the container A by placing the kernels of pop corn within the receptacle B. The receptacle B is provided with a mesh cylindrical body portion 10 having a handle member 11 extending across the top of the same and reinforcing edge 12 formed annularly about the body 10 directly below the handle 11, and providing a dispensing funnel member 13 projecting from the bottom portion of the body 10.

The receptacle B is designed to be provided with a frame C, which is made up of a series of supporting legs or members 14 projecting from the side wall of the body portion 10 and the lower ends of these legs 14 being bent upwardly at 15 to provide engaging means for a ring 16, which is connected to the legs 14 in a manner to hold the same equally spaced apart and thereby provide a rigid supporting foot and frame member C for the receptacle B.

The dispensing mechanism of my receptacle B is provided with the funnel 13 and a funnel shaped perforated valve member 18 positioned within the funnel 13 and adapted to close the open end 19 of the member 13. The perforated valve member 18 is secured to the rod 20 by means of the nut 21 and the nut 22. The nut 21 is positioned on the outside of the valve 18 while the nut 22 is adapted to engage within the valve so as to pinch the upper end of the valve between nuts 21 and 22, thus holding the valve rigidly attached to the operating rod 20.

Within the body 10 of the receptacle B I provide a cross brace member 24 which is rigidly secured in the receptacle B and through which the rod 20 passes to form a support for the same. The brace 24 also forms a stop against which the coil spring 25 rests, which is positioned about the lower end of the rod 20 between the brace 24 and the nut 21 in a manner so that by pulling upon the operating end 23 of the rod 20 the spring 25 will be compressed and the valve 18 moved into open position. When the valve 18 is operated in this manner the kernels of pop corn within the receptacle B are adapted to slide over the surface of the valve 18, evenly about the same and out through the opening 19 of the dispensing funnel 13. This permits the pop corn kernels in the lower end of the receptacle B to slide out first and in a manner so that the kernels above will settle down to take the place of the kernels that have passed out of the opening 19. By permitting the valve 18 to snap back into closed position with its flared edge resting sharply against the inner surface of the dispensing funnel 13, the flow of the kernels is sharply cut off and the valve is closed quickly to prevent kernels from sticking between the edge of the valve and the inner surface of the funnel.

Figure 3:
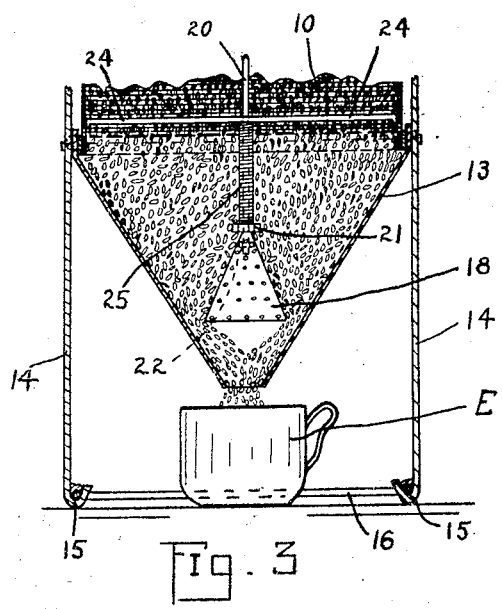
Figure 3 illustrates a portion of the pop corn kernel receptacle showing the manner of dispensing kernels of corn out of the same.
Figure 4:
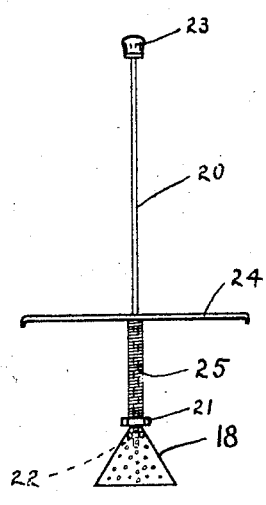
Figure 4 illustrates the valve of my pop corn kernel receptacle removed from the body of the receptacle.

I have illustrated in Figure 3 the operation of my valve 18 in the dispensing funnel 13 and when the cup E is filled with pop corn the valve 18 is quickly closed by the spring 25 when the operating handle 23 is released.

The valve 18 is formed with a series of perforations so that the humidity within the container A may pass up in through the opening 19 and directly in contact with the kernels of corn within the receptacle B.

In carrying out my method body portion 10 of the receptacle B is filled with kernels of pop corn and hot water is placed in the container A sufficient to partially cover the sponge 26. A portion of this sponge 26 projecting out of the water in the body of the container A has a tendency to draw the moisture up into the air and provide a means for humidifying all of the air within the container A. Then by placing the receptacle B within the container A and applying the cover 27 on the container A to close the same, the pop corn kernels within the receptacle B are subjected to the humidified air within the container A for a certain period of time. I have found in carrying out my method that two or three days is sufficient to properly treat the pop corn kernels. It is apparent, however, that in some instances it may take a longer time, depending on the nature of the pop corn and the age of the same.

When the pop corn has been properly treated with my method it is then ready to be dispensed at the dispensing end 13 of the receptacle B. I have found that pop corn treated with my method is adapted to fairly burst in popping so that there is little or no hull left to the kernel, in fact the hull is broken away from the exploded kernel to such an extent that only the crisp creamy substance of the kernel is left. This is caused by the humidified kernels which have absorbed sufficient moisture so that when they are subjected to the extreme heat in popping, instead of burning hard in the hull before popping to leave a hard tough hull adhering to the kernel, my method so prepares the kernel of corn that the moisture in the kernel is adapted to form steam sufficient to blow up the kernel with considerable force and exploding the undesirable hull from the kernel, giving a large, fluffy kernel, even to pop corn where ordinarily without subjecting it to my method the pop corn kernels would only be small and not of a tasty nature, as they are when treated with my method.

In this manner I provide a method for treating kernels of pop corn consisting in humidifying the atmosphere in a container, in which the pop corn is held within a receptacle having a porous nature so that the humidified air within the container can pass in and about the kernels of pop corn to permit the same to absorb the humidity and become sufficiently treated to give the most desirable effect when popping these treated kernels.

In use my method has proven to be very efficient, as the device for treating the kernels of pop corn has proved quite extensively that the treated kernals will pop much more efficiently and a greater percentage of the same than where the pop corn kernels have not been treated by my method. It is therefore apparent that my method of treating kernels of pop corn is quite desirable and by my simple device for carrying out my method I provide a practical means for those having pop corn machines and desiring to offer to their customers a most tasty popped kernel and also to get the most efficiency out of their pop corn machine.

My device provides a suitable storage compartment for the kernels of pop corn which may be conveniently stored away, keeping a sufficient amount of corn within the receptacle and also providing a means of quickly dispensing the kernels of pop corn from the same.

I have found that my method of treating the kernels of pop corn is extremely efficient in preparing the kernels which ordinarily would not be suitable to provide good pop corn, as the same would not be properly popped nor would it be tasty after it had been popped by reason of the fact that the kernels would not be wide open but would just sort of half pop and be of a tough and undesirable nature, whereas with my method this same grade of pop corn, which by reason of the fact that the kernels were apparently dried out or too old, would pop most efficiently and in a manner so as to provide a fully exploded kernel, large and deliciously tasty.

Thus my method and device for treating pop corn is very important as it makes a material saving, eliminating the waste of a large percentage of the kernels and moreover providing a much more delicious pop corn. It will be noted that this method is carried out at atmospheric pressure.

In accordance with the patent statutes I have described the principles of my method and device for carrying the same, which I have endeavored to describe and illustrate, but I desire to have it understood that the means set forth are only suggestive and that the same may be applied by other methods and means within the scope of the following claims.

I claim:—

1. The method of treating pop corn kernels which consists of subjecting the kernels to humid air at normal temperatures whereby the moisture is absorbed by the kernels.

2. The method of treating pop corn kernels which consists of subjecting the kernels to humid air at normal temperatures and atmospheric pressure whereby moisture is absorbed by the kernels.

3. The method of treating pop corn kernels which consists in exposing the kernels to the action of humid air at normal temperatures and atmospheric pressure and then popping the kernels.

4. The method of treating pop corn kernels which consists of subjecting the kernels to humid air at normal temperatures until the kernels are uniformly moistened whereby the kernels may be popped uniformly.

5. The method of treating pop corn kernels which consists of subjecting the kernels to humid air at normal temperatures and atmospheric pressure until the kernels are uniformly moistened whereby the kernels may be popped uniformly.

EUGENE J. LE CLAIRE.